(12) United States Patent
Suzuki et al.

(10) Patent No.: US 12,328,050 B2
(45) Date of Patent: Jun. 10, 2025

(54) ELECTRIC MOTOR

(71) Applicant: KABUSHIKI KAISHA TOYOTA JIDOSHOKKI, Aichi-ken (JP)

(72) Inventors: Noriyuki Suzuki, Kariya (JP); Yoshiyuki Nakane, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 333 days.

(21) Appl. No.: 18/119,674

(22) Filed: Mar. 9, 2023

(65) Prior Publication Data

US 2023/0307977 A1 Sep. 28, 2023

(30) Foreign Application Priority Data

Mar. 22, 2022 (JP) .................. 2022-045458

(51) Int. Cl.
| | |
|---|---|
| *H02K 3/487* | (2006.01) |
| *H02K 1/14* | (2006.01) |
| *H02K 21/16* | (2006.01) |

(52) U.S. Cl.
CPC ............. *H02K 3/487* (2013.01); *H02K 1/146* (2013.01); *H02K 21/16* (2013.01)

(58) Field of Classification Search
CPC ........ H02K 3/522; H02K 21/16; H02K 1/146; H02K 1/2766; H02K 3/487; H02K 2213/03
USPC ....................................................... 310/214
See application file for complete search history.

(56) References Cited

U.S. PATENT DOCUMENTS

| | | | | |
|---|---|---|---|---|
| 4,015,156 A | * | 3/1977 | Johrde | H02K 3/487 |
| | | | | 310/214 |
| 4,409,502 A | * | 10/1983 | McCabria | H02K 3/24 |
| | | | | 310/214 |
| 6,008,563 A | | 12/1999 | Baba et al. | |
| 6,113,024 A | * | 9/2000 | Pittard | H02K 3/527 |
| | | | | 242/433 |
| 6,713,927 B2 | * | 3/2004 | Kikuchi | H02K 3/24 |
| | | | | 310/214 |
| 6,870,292 B2 | * | 3/2005 | Owada | H02K 3/24 |
| | | | | 310/194 |
| 7,825,552 B2 | * | 11/2010 | Husband | H02K 1/20 |
| | | | | 310/216.081 |
| 8,008,831 B2 | * | 8/2011 | Takeshita | H02K 3/487 |
| | | | | 310/214 |
| 9,300,179 B2 | * | 3/2016 | Sawada | H02K 3/30 |

(Continued)

FOREIGN PATENT DOCUMENTS

JP   H11-136897 A   5/1999

*Primary Examiner* — Alex W Mok
(74) *Attorney, Agent, or Firm* — Greenblum & Bernstein, P.L.C.

(57) ABSTRACT

An electric motor includes a slot insulation member arranged in a slot between adjacent ones of coils in a circumferential direction of a yoke. The slot insulation member is a wedge-shaped spacer and includes a main body and projections. The projections are arranged in the slot and projected from the main body. The coil includes a main coil portion, a coil end, and a bent coil portion. The main coil portion is arranged in the slot and sandwiched between a corresponding one of the projections and a corresponding tooth. The coil end is arranged outside the slot and contacts the main body. The coil end is wider than the main coil portion. The bent coil portion connects the main coil portion and the coil end.

4 Claims, 3 Drawing Sheets

(56) References Cited

U.S. PATENT DOCUMENTS

| | | | |
|---|---|---|---|
| 11,394,283 B2* | 7/2022 | Walisko | H02K 3/34 |
| 11,539,265 B2* | 12/2022 | Fella | H02K 3/487 |
| 2020/0235616 A1* | 7/2020 | Suzuki | H02K 3/24 |

* cited by examiner

ELECTRIC MOTOR

BACKGROUND

1. Field

The following description relates to an electric motor.

2. Description of Related Art

Japanese Laid-Open Patent Publication No. 11-136897 discloses an electric motor including a rotor fixed to a rotation shaft and rotated integrally with the rotation shaft, and a stator arranged at an outer side of the rotor. The stator includes a stator core, coils, and a slot insulation member. The stator core includes a cylindrical yoke extending in an axial direction of the rotation shaft, and teeth extending from an inner circumferential surface of the yoke toward the rotor. A slot is defined between adjacent ones of the teeth in a circumferential direction of the yoke. A coil is wound around each of the teeth with a tooth insulation member arranged therebetween. The slot insulation member is arranged in the slot between the adjacent ones of the coils in the circumferential direction of the yoke.

SUMMARY

When coil ends are compression-molded from the two opposite sides in the axial direction of the yoke to decrease the length of the rotation shaft, the coil may be separated from the two opposite ends of a tooth in the circumferential direction of the yoke. This may affect the magnetic flux of the rotor and cause eddy current to flow through the portion of the coil facing the rotor. In such a case, eddy-current loss may occur.

In one general aspect, an electric motor includes a rotation shaft, a rotor fixed to the rotation shaft and rotated integrally with the rotation shaft, and a stator arranged at an outer side of the rotor. The stator includes a stator core, coils, a tooth insulation member, and a slot insulation member. The stator core includes a cylindrical yoke extending in an axial direction of the rotation shaft, and teeth extending from an inner circumferential surface of the yoke toward the rotor. Adjacent ones of the teeth in a circumferential direction of the yoke define a slot therebetween. The coils are respectively wound around the teeth. The tooth insulation member is arranged between each of the teeth and a corresponding one of the coils. The slot insulation member is arranged in the slot between adjacent ones of the coils in the circumferential direction. The slot insulation member is a wedge-shaped spacer that presses the adjacent ones of the coils, between which the slot insulation member is arranged, against corresponding ones of the teeth around which the adjacent ones of the coils are wound. The slot insulation member includes a main body and projections. The main body is shaped gradually narrow from the rotor toward the yoke. The projections are arranged in the slot and projected from the main body toward the adjacent ones of the coils between which the main body is arranged. The adjacent ones of the coils each include a main coil portion, a coil end, and a bent coil portion. The main coil portion is arranged in the slot and sandwiched between a corresponding one of the projections and a corresponding one of the teeth. The coil end is arranged outside the slot and contacts the main body. The coil end is wider than the main coil portion. The bent coil portion connects the main coil portion and the coil end.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An electric motor in accordance with an embodiment will now be described with reference to FIGS. 1 to 5.

Figure 1:
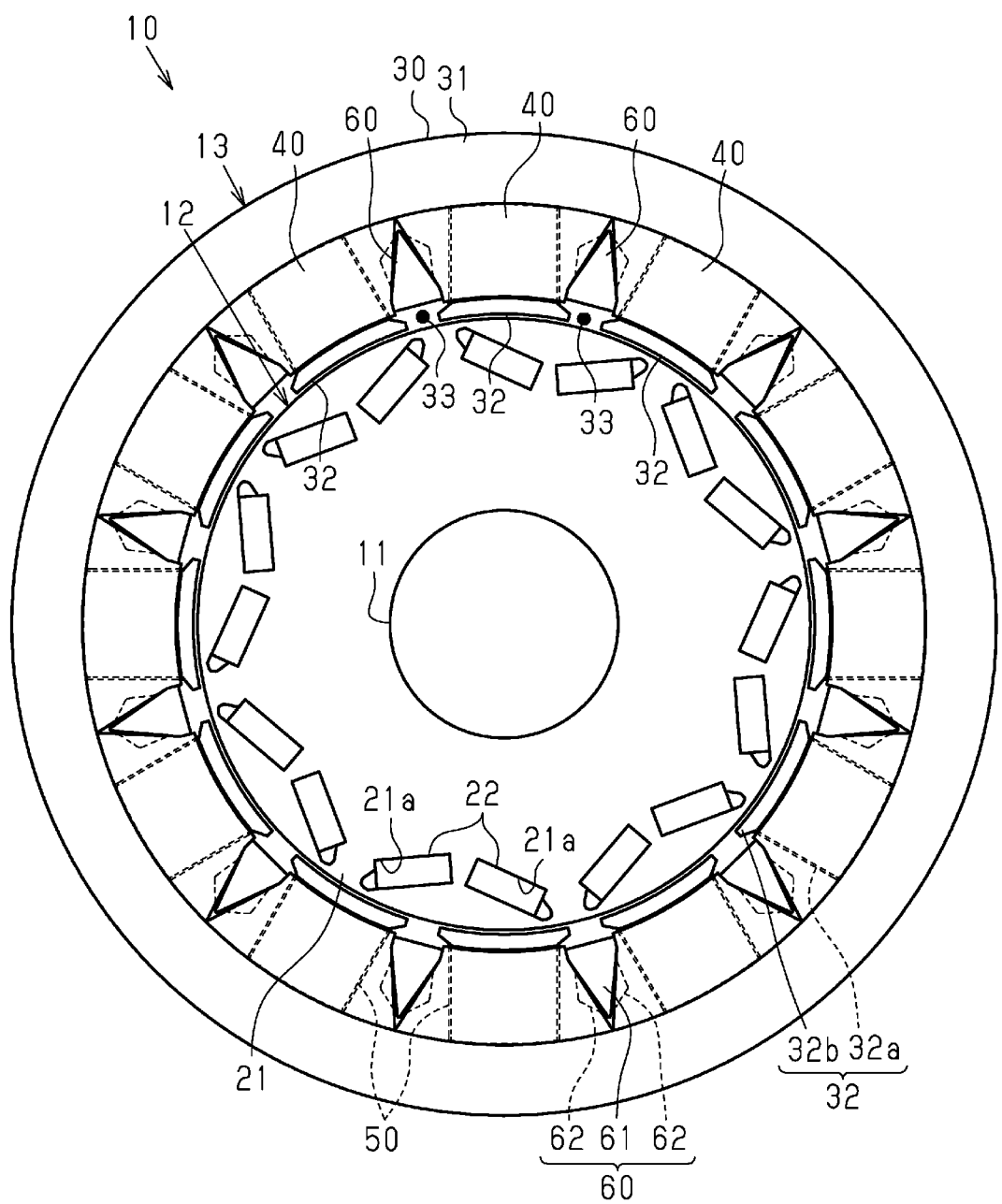
FIG. 1 is a plan view of an electric motor.

As shown in FIG. 1, an electric motor 10 includes a rotation shaft 11, a rotor 12, and a stator 13.

Rotor

The rotor 12 includes a cylindrical rotor core 21 and permanent magnets 22. The rotor core 21 includes magnet accommodation holes 21*a* extending through the rotor core 21 in an axial direction of the rotor core 21. The magnet accommodation holes 21*a* are arranged next to one another in a circumferential direction of the rotor core 21. The permanent magnets 22 are accommodated in the magnet accommodation holes 21*a*, respectively. The rotor 12 of the present embodiment is of an interior permanent magnet (IPM) type in which the permanent magnets 22 are embedded in the rotor core 21.

The rotation shaft 11 extends through the rotor core 21. The rotor 12 is fixed to the rotation shaft 11. The rotor 12 is rotated integrally with the rotation shaft 11.

Stator

The stator 13 is arranged at a radially outer side of the rotor 12. The stator 13 includes a stator core 30, coils 40, tooth insulation members 50, and slot insulation members 60.

The stator core 30 includes a cylindrical yoke 31 extending in an axial direction of the rotation shaft 11, and teeth 32 extending from an inner circumferential surface of the yoke 31 toward the rotor 12. The teeth 32 are arranged in intervals in a circumferential direction of the yoke 31. Adjacent ones of the teeth 32 in the circumferential direction of the yoke 31 define an open space therebetween, which is referred to as a slot 33. Each tooth 32 includes an extension portion 32*a* and a flange portion 32b. The extension portion 32a is a portion of the tooth 32 extending in a radial direction of the yoke 31. The extension portion 32a includes two ends in the radial direction of the yoke 31. The flange portion 32b is a portion of the tooth 32 extending from the end of the extension portion 32a located closer to the rotor 12. The flange portion 32b extends in the circumferential direction of the yoke 31.

Figure 2:
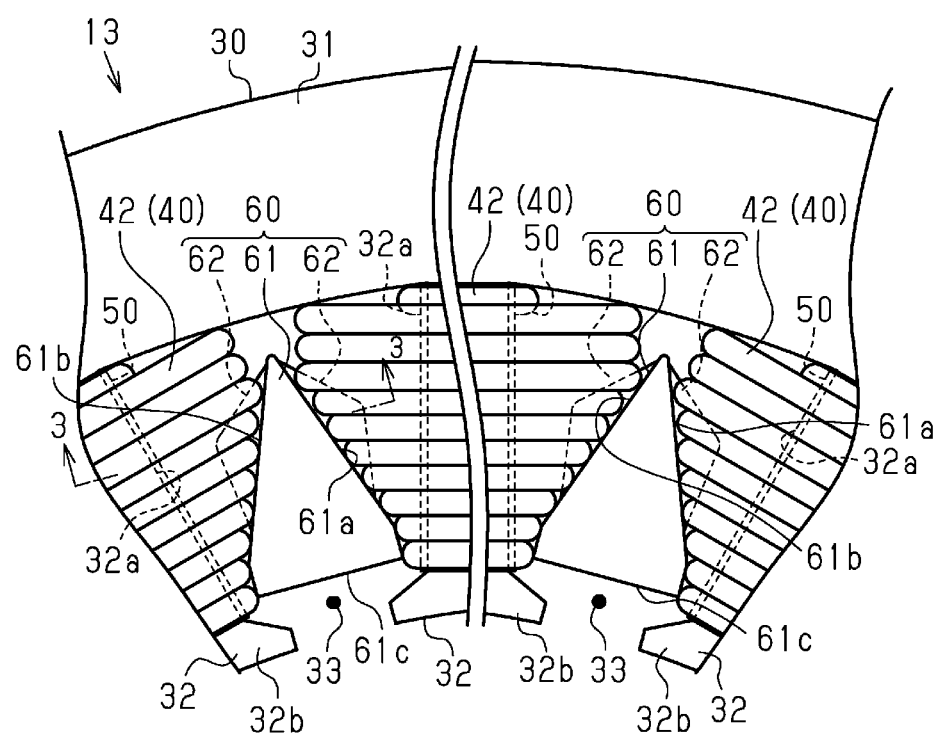
FIG. 2 is a plan view showing part of the electric motor illustrated in FIG. 1.
Figure 3:
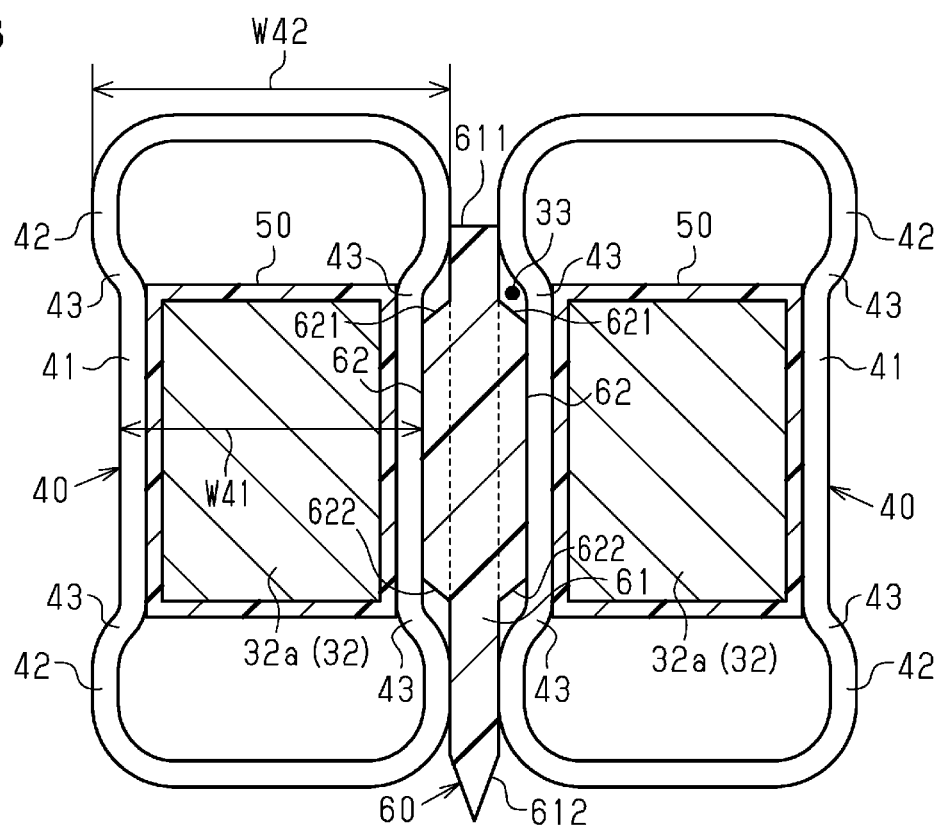
FIG. 3 is a cross-sectional view taken along line 3-3 shown in FIG. 2.

As shown in FIGS. 2 and 3, a coil 40 is wound around each tooth 32. Specifically, the coil 40 is wound around the extension portion 32a of the tooth 32. A tooth insulation member 50 is arranged between the tooth 32 and the coil 40. The tooth insulation member 50 covers two end surfaces of the tooth 32 in an axial direction of the yoke 31 and two end surfaces of the tooth 32 in the circumferential direction of the yoke 31. Thus, the coil 40 is wound around the tooth 32 with the tooth insulation member 50 arranged therebetween. Although FIG. 3 shows only one layer of the coil 40, the coil 40 is actually wound in layers around the tooth 32.

The coil 40 includes a main coil portion 41, coil ends 42, and bent coil portions 43. The main coil portion 41 is a portion of the coil 40 located inside the slot 33. In other words, the main coil portion 41 is located between the two end surfaces of the tooth 32 in the axial direction of the yoke 31. The coil ends 42 are portions of the coil 40 located outside the slot 33. In other words, the coil ends 42 are located at the two sides of the tooth 32 in the axial direction of the yoke 31. A width W42 of the coil ends 42 is greater than a width W41 of the main coil portion 41. That is, the coil ends 42 are wider than the main coil portion 41. The width W41 refers to the dimension of the main coil portion 41 in the circumferential direction of the yoke 31, and the width W42 refers to the dimension of the coil end 42 in the circumferential direction of the yoke 31. The bent coil portions 43 are portions of the coil 40 that connect the main coil portion 41 and the coil ends 42.

A slot insulation member 60 is arranged between adjacent ones of the coils 40 in the circumferential direction of the yoke 31. The slot insulation member 60 is a wedge-shaped spacer that presses the coils 40 arranged adjacent to the slot insulation member 60 in the circumferential direction of the yoke 31 against the teeth 32 around which the coils 40 are wound. The slot insulation member 60 includes a main body 61 and two projections 62.

The main body 61 includes a first side surface 61a, a second side surface 61b, and a third side surface 61c that extend in the axial direction of the yoke 31. The first side surface 61a faces one of the two coils 40 located at two sides of the slot insulation member 60 in the circumferential direction of the yoke 31. The second side surface 61b faces the other one of the two coils 40 located at the two sides of the slot insulation member 60 in the circumferential direction of the yoke 31. The third side surface 61c faces the rotor 12. The first side surface 61a and the second side surface 61b are inclined with respect to the radial direction of the yoke 31 such that the first and second side surfaces 61a and 61b become closer to each other toward the yoke 31 in the radial direction of the yoke 31. Thus, the main body 61 is shaped to gradually narrow from the rotor 12 toward the yoke 31 as viewed in the axial direction of the yoke 31.

Each projection 62 is arranged in the slot 33 and projects from the main body 61 toward the corresponding coil 40 located adjacent to the main body 61 in the circumferential direction of the yoke 31. Specifically, one of the two projections 62 projects from the first side surface 61a of the main body 61, and the other one of the two projections 62 projects from the second side surface 61b of the main body 61. The projection 62 of the present embodiment has the form of a substantially triangular prism and extends in the axial direction of the yoke 31. The projection 62 has the form of a triangular prism as viewed in the axial direction of the yoke 31. The projection 62 has substantially the same dimension as the teeth 32 in the axial direction of the yoke 31.

Figure 4:
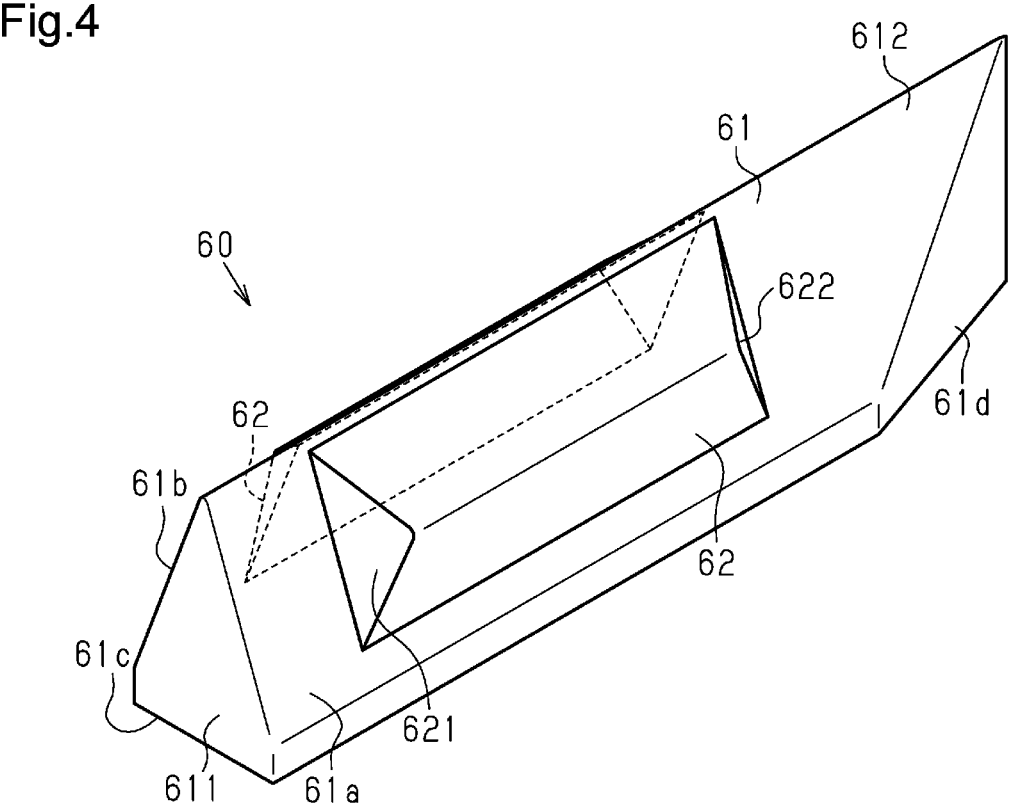
FIG. 4 is a perspective view of a slot insulation member.
Figure 5:
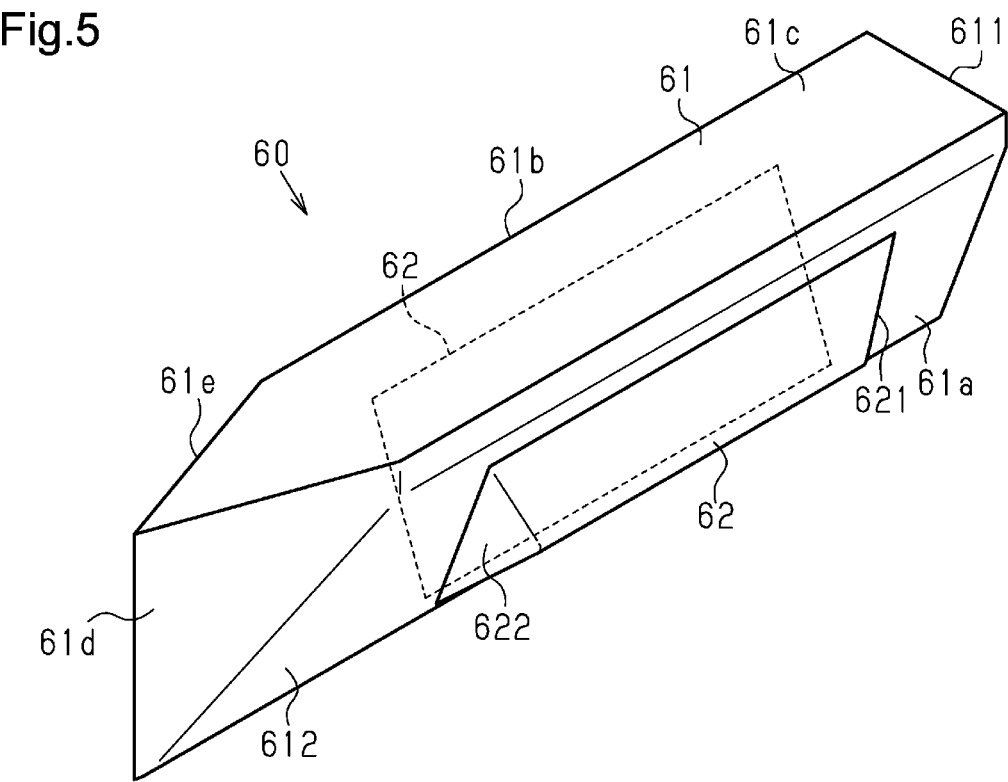
FIG. 5 is a perspective view of the slot insulation member.

As shown in FIGS. 4 and 5, the main body 61 includes a first end 611 and a second end 612. The first end 611 and the second end 612 are the ends of the main body 61 in the axial direction of the yoke 31. The second end 612 is located opposite to the first end 611 in the axial direction of the yoke 31. The first end 611 of the present embodiment is a triangular flat surface. The second end 612 of the present embodiment has a tapered shape and gradually narrows as the second end 612 becomes farther away from the projection 62 in the axial direction of the yoke 31.

Specifically, the first side surface 61a, the second side surface 61b, and the third side surface 61c are narrowed at the second end 612. The first side surface 61a has two long sides, and the long side connected with the second side surface 61b is longer than the other long side connected with the third side surface 61c. The second side surface 61b has two long sides, and the long side connected with the first side surface 61a is longer than the other long side connected with the third side surface 61c. The third side surface 61c has two long sides that become closer to each other at the second end 612 as the two long sides become farther away from the projection 62. The main body 61 includes a triangular first connection surface 61d and a triangular second connection surface 61e at the second end 612. The first connection surface 61d connects the first side surface 61a and the third side surface 61c. The second connection surface 61e connects the second side surface 61b and the third side surface 61c. The first connection surface 61d and the second connection surface 61e are inclined with respect to the axial direction of the yoke 31 so as to become closer to each other as the first connection surface 61d and the second connection surface 61e become farther away from the projection 62.

The projection 62 includes a first end surface 621 and a second end surface 622. The first end surface 621 and the second end surface 622 are the end surfaces of the projection 62 in the axial direction of the yoke 31. The second end surface 622 is located opposite to the first end surface 621 in the axial direction of the yoke 31. The first end surface 621 and the second end surface 622 are sloped such that the projection height from the main body 61 gradually decreases as the first end surface 621 and the second end surface 622 become closer to the corresponding coil ends 42 in the axial direction of the yoke 31. In other words, the first end surface 621 and the second end surface 622 become closer to the main body 61 as the first end surface 621 and the second end surface 622 become closer to the corresponding coil ends 42 in the axial direction of the yoke 31.

As described above, the slot insulation member 60 is arranged between two adjacent ones of the coils 40 in the circumferential direction of the yoke 31. Specifically, portions of the main body 61 free from the projection 62 are located outside the slot 33 between the two coil ends 42 arranged adjacent to each other in the circumferential direction of the yoke 31. The coil ends 42 contact the main body 61. The projections 62 and the portion of the main body 61 where the projection 62 is formed are located inside the slot 33 between the two main coil portions 41 arranged adjacent to each other in the circumferential direction of the yoke 31. The main coil portion 41 is sandwiched between the corresponding projection 62 and tooth 32 in the slot 33. The slot insulation member 60 will not separate from the coils 40 due to the spring back effect of the coils 40 located at the two sides of the slot insulation member 60 in the circumferential direction of the yoke 31.

Operation of Present Embodiment

The operation of the present embodiment and a method for manufacturing the stator 13 will now be described.

First, the coils 40 are wound around the teeth 32 in a state in which the tooth insulation members 50 are arranged between the teeth 32 and the coils 40. In this case, the coil ends 42 have substantially the same width as the width W41 of the main coil portion 41 in the circumferential direction of the yoke 31.

Then, the slot insulation members 60 are inserted between adjacent ones of the coils 40 in the circumferential direction of the yoke 31. Each slot insulation member 60 is inserted between two coils 40 that are adjacent to each other in the circumferential direction of the yoke 31 from one side of the slot insulation member 60 in the axial direction of the yoke 31. The slot insulation member 60 is inserted between the coils 40 from the second end 612. In a state in which the slot insulation member 60 is inserted between the coils 40, the main coil portions 41 are sandwiched between the projections 62 and the corresponding teeth 32. The projections 62 press the opposing coils 40 in the circumferential direction of the yoke 31 against the corresponding teeth 32.

Subsequently, the coil ends 42 are compressed from both sides in the axial direction of the yoke 31 to shape the coils 40. This increases the width of the coil ends 42 by an amount corresponding to the decrease in the dimension of the coil ends 42 in the axial direction of the yoke 31. As a result, the width W42 of the coil end 42 becomes greater than the width W41 of the main coil portion 41. Further, the coil ends 42 contact the main body 61 of the slot insulation member 60 in the circumferential direction of the yoke 31. Since the projections 62 press the coils 40 toward the teeth 32, the coils 40 will not be separated from the two end surfaces of the corresponding teeth 32 in the circumferential direction of the yoke 31 when the coil ends 42 are compressed from the two sides in the axial direction of the yoke 31. Accordingly, the coils 40 will be kept in place so as not to face the rotor 12, and the flow of eddy current to the coils 40 will be limited.

Advantage of Present Embodiment

The present embodiment has the following advantages.

(1) The slot insulation member 60 is a wedge-shaped spacer that presses the coils 40 that are adjacent to the slot insulation member 60 in the circumferential direction of the yoke 31 against the teeth 32 around which the coils 40 are wound. The slot insulation member 60 includes the main body 61 and the projection 62. The main body 61 is shaped to gradually narrow from the rotor 12 toward the yoke 31. The projections 62 are arranged in the slot 33 and projected from the main body 61 toward the coils 40 located adjacent to the main body 61. Each coil 40 includes the main coil portion 41 and the coil ends 42. The main coil portion 41 is arranged in the slot 33 and sandwiched between the corresponding projection 62 and tooth 32. The coil ends 42 are arranged outside the slot 33 and shaped to have a greater width than the main coil portion 41. The coil ends 42 contact the main body 61.

The coil ends 42 are wider than the main coil portion 41, and the coil ends 42 are shorter in the axial direction of the yoke 31 than when the width W42 of the coil ends 42 are less than or equal to the width W41 of the main coil portion 41. This allows the rotation shaft 11 to be decreased in length. Further, each projection 62 of the slot insulation member 60 presses the main coil portion 41 toward the corresponding tooth 32. Accordingly, when the coil ends 42 are compressed from the two sides in the axial direction of the yoke 31, the coil 40 will not be separated from the two end surfaces of the tooth 32 in the circumferential direction of the yoke 31 and will be kept in place so as not to face the rotor 12. This limits the flow of eddy current to the coil 40. Consequently, the rotation shaft 11 may be decreased in length while avoiding occurrence of eddy-current loss.

(2) The main body 61 of the slot insulation member 60 includes the tapered second end 612 that is gradually narrowed as the second end 612 becomes farther away from the projection 62 in the axial direction of the yoke 31. The slot insulation member 60 is inserted between adjacent ones of the coils 40 in the circumferential direction of the yoke 31 from one side of the slot insulation member 60 in the axial direction of the yoke 31. Thus, the slot insulation member 60 is smoothly inserted between the coils 40 from the second end 612 of the main body 61.

(3) The projections 62 each include the first end surface 621 and the second end surface 622 that are sloped so that the projected height from the main body 61 gradually decreases as the first end surface 621 and the second end surface 622 become closer to the corresponding coil ends 42 in the axial direction of the yoke 31. This allows the slot insulation member 60 to be smoothly inserted between the coils 40.

(4) By restricting separation of each coil 40 from the two end surfaces of the corresponding tooth 32 in the circumferential direction of the yoke 31, heat can be released from the coil 40 to the tooth 32 through the tooth insulation member 50. Since the coil 40 does not separate from the tooth 32, heat will be dissipated from the coil 40 in a preferred manner.

(5) If the projection 62 were to be longer than the corresponding tooth 32 in the axial direction of the yoke 31, the coil ends 42 may interfere with the projection 62 when compressed from the two sides in the axial direction of the yoke 31. The interference between the coil ends 42 and the projection 62 will hinder the shaping of the coil ends 42 that have a large width. In the present embodiment, the projection 62 has the same length as the tooth 32 in the axial direction of the yoke 31. Thus, the coil ends 42 will not interfere with the projection 62 when compressed from the two sides in the axial direction of the yoke 31. This allows the coil ends 42 to be shaped so as to have a large width.

(6) If the projection 62 is shorter than the tooth 32 in the axial direction of the yoke 31, the projection 62 will not press part of the main coil portion 41 in the axial direction of the yoke 31 toward the tooth 32. In the present embodiment, the projection 62 has the same length as the tooth 32 in the axial direction of the yoke 31. This allows the projection 62 to press the entire main coil portion 41 in the axial direction of the yoke 31 toward the tooth 32. Therefore, the entire main coil portion 41 in the axial direction of the yoke 31 is less likely to be separated from the tooth 32.

Modified Examples

The above embodiment may be modified as described below. The above-described embodiment and the following modifications may be combined as long as the combined modifications remain technically consistent with each other.

The first end 611 of the main body 61 may be tapered, in the same manner as the second end 612, such that the first end 611 gradually narrows as the first end 611 becomes farther away from the projection 62 in the axial direction of the yoke 31. In this case, the slot insulation member 60 will be smoothly inserted between the coils 40 regardless of whether it is inserted from the first end 611 or the second end 612.

The projection 62 may be shorter or longer than the tooth 32 in the axial direction of the yoke 31.

The projection 62 may be formed so that only the second end surface 622 is sloped so that the projected height from the main body 61 gradually decreases as the second end surface 622 becomes closer to the corresponding coil end 42 in the axial direction of the yoke 31.

The projection 62 does not have to have the form of a triangular prism. For example, the projection 62 may have the form of a semicircular column extending in the axial direction of the yoke 31.

The tooth insulation member 50 may have any structure as long as the tooth insulation member 50 is arranged between the tooth 32 and the coil 40.

The rotor 12 may have a different structure. For example, the rotor 12 may be of a surface permanent magnet (SPM) type in which the permanent magnets 22 are arranged on the outer circumferential surface of the rotor core 21.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electric motor, comprising:
   a rotation shaft;
   a rotor fixed to the rotation shaft and rotated integrally with the rotation shaft; and
   a stator arranged at an outer side of the rotor, wherein:
   the stator includes
      a stator core including a cylindrical yoke extending in an axial direction of the rotation shaft and teeth extending from an inner circumferential surface of the yoke toward the rotor, adjacent ones of the teeth in a circumferential direction of the yoke define a slot therebetween,
      coils respectively wound around the teeth,
      a tooth insulation member arranged between each of the teeth and a corresponding one of the coils, and
      a slot insulation member arranged in the slot between adjacent ones of the coils in the circumferential direction;
   the slot insulation member is a wedge-shaped spacer that presses the adjacent ones of the coils, between which the slot insulation member is arranged, against corresponding ones of the teeth around which the adjacent ones of the coils are wound;
   the slot insulation member includes
      a main body shaped to gradually narrow from the rotor toward the yoke, and
      projections arranged in the slot and projecting from the main body toward the adjacent ones of the coils between which the main body is arranged; and
   the adjacent ones of the coils each include
      a main coil portion arranged in the slot and sandwiched between a corresponding one of the projections and a corresponding one of the teeth,
      a coil end arranged outside the slot and contacting the main body, the coil end being wider than the main coil portion, and
      a bent coil portion connecting the main coil portion and the coil end.

2. The electric motor according to claim 1, wherein the main body includes a tapered end that is gradually narrowed as the tapered end becomes farther away from the projections in an axial direction of the yoke.

3. The electric motor according to claim 1, wherein the projections each include an end surface having a projected height from the main body that gradually decreases as the end surface becomes closer to the coil end in an axial direction of the yoke.

4. The electric motor according to claim 1, wherein the projections have the same dimension as the teeth in an axial direction of the yoke.

* * * * *